(12) United States Patent
Ransijn (10) Patent No.: US 9,019,669 B1
(45) Date of Patent: Apr. 28, 2015

(54) DISTRIBUTED ELECTROSTATIC DISCHARGE PROTECTION CIRCUIT

(71) Applicant: PMC-Sierra US, Inc., Sunnyvale, CA (US)

(72) Inventor: Johannes G. Ransijn, Wyomissing Hills, PA (US)

(73) Assignee: PMC-Sierra US, Inc., Sunnyvale, CA (US)

( * ) Notice: Subject to any disclaimer, the term of this patent is extended or adjusted under 35 U.S.C. 154(b) by 139 days.

(21) Appl. No.: 13/720,048

(22) Filed: Dec. 19, 2012

(51) Int. Cl.
*H02H 9/00* (2006.01)
*H02H 3/20* (2006.01)

(52) U.S. Cl.
CPC ...................................... *H02H 3/20* (2013.01)

(58) Field of Classification Search
USPC .......................................................... 361/56
See application file for complete search history.

(56) References Cited

U.S. PATENT DOCUMENTS

| | | | |
|---|---|---|---|
| 5,329,143 A * | 7/1994 | Chan et al. ..................... | 257/173 |
| 5,751,507 A * | 5/1998 | Watt et al. ....................... | 361/56 |
| 5,969,929 A | 10/1999 | Kleveland et al. | |
| 7,005,939 B2 | 2/2006 | Zerbe et al. | |
| 2005/0162790 A1 | 7/2005 | Yoshinaga | |
| 2006/0256489 A1 | 11/2006 | Ker et al. | |

OTHER PUBLICATIONS

Galal et al., "Broadband ESD protection circuits in CMOS technology," IEEE Journal of Solid-State Circuits, vol. 38, No. 12, Dec. 2003, pp. 2334-2340, US.
Kleveland et al., "Distributed ESD protection for high-speed integrated circuits," IEEE Electron Device Letters, vol. 21, No. 8, Aug. 2000, pp. 390-392, US.
Ker et al., "Decreasing-Size Distributed ESD Protection Scheme for Broad-Band RF Circuits," IEEE Transactions on Microwave Theory and Techniques, vol. 53, No. 2, Feb. 2005, pp. 582-589, US.

\* cited by examiner

*Primary Examiner* — Stephen W Jackson
(74) *Attorney, Agent, or Firm* — Dennis R. Haszko (57) ABSTRACT

A distributed electrostatic discharge (ESD) protection circuit is provided. At frequencies beyond 10 GHz, the parasitic capacitance of primary ESD protection voltage clamping devices, such as diodes, hampers adequate insertion and return loss, in spite of lumped inductor tuning. An ESD protection circuit according to an embodiment of the present disclosure solves the problem by distributing the diode, or voltage clamping device, capacitance among several sections of an artificial transmission line. The power and ground ESD return paths are also distributed to ensure a constant current density in the voltage clamping segments, even for fast charged-device model (CDM) discharge events. By sharing the ESD return paths between differential inputs (or outputs), these return paths have no impact on differential return or insertion loss.

26 Claims, 12 Drawing Sheets

DISTRIBUTED ELECTROSTATIC DISCHARGE PROTECTION CIRCUIT

FIELD

The present disclosure relates generally to digital telecommunications and integrated circuits. More particularly, the present disclosure relates to protection of integrated circuits from electrostatic discharge.

BACKGROUND

The ever-increasing capacity of digital networking equipment poses increased demand on the interface speeds of today's complementary metal oxide semiconductor (CMOS) chips. At the same time, this increase has resulted in the need for CMOS technologies with smaller device geometries and thinner oxides that are more sensitive to damage due to Electrostatic Discharge (ESD).

The first line of defense against ESD is a pair of diodes, connected between pad and supply buses, that absorb the discharge current and limit the voltage between the bond pads or bumps (pins, if packaged) connecting the chip to the outside world.

Figure 1:
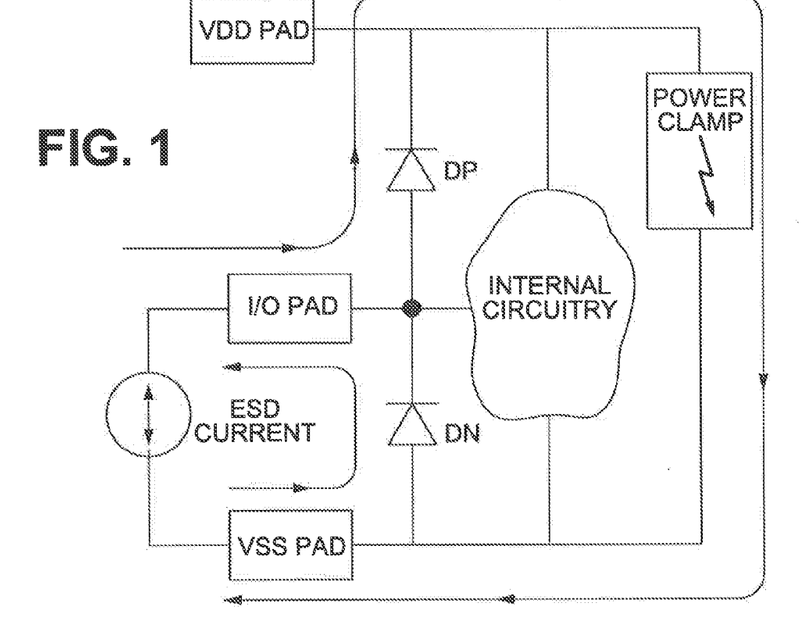
FIG. 1 illustrates a typical scenario for a circuit with ESD diode protection.

FIG. 1 illustrates a typical scenario for a circuit with ESD diode protection. During an ESD event, in this example between the input/output pad and VSS, the discharge current passes either through the upper diode DP and a power clamp, to return to its source through the VSS pad (in case of a positive current) or enters the VSS pad, passes through the lower diode DN and exits through the I/O pad. In either case the sensitive internal circuitry is protected by the voltage-limiting properties of the ESD protection diodes that provide a discharge path around the circuitry.

In normal use the ESD diodes are reverse-biased and do not present a significant DC current path that might affect the normal operation of the circuit. They do possess capacitance, however, which poses an AC path to ground and may load and distort the received (or transmitted) signal at high frequencies. This capacitance is largely determined by the physical size (junction area) of the ESD diodes, which in turn is given by the amount of ESD current the diodes need to be able to absorb. Process technology has little influence: contrary to MOS devices, the intrinsic properties of junction diodes do not scale with process node. If anything, process nodes with smaller device geometries typically have thinner routing metals and smaller intra-level vias, making it even harder to provide a low-resistance and low-capacitance discharge path around the CMOS circuitry.

Although the processing speed of CMOS technology keeps increasing each time device feature sizes shrink, the junction area of the primary ESD protection diodes remains the same for a given level of protection. The parasitic capacitance associated with the diode junction limits the I/O bandwidth of receivers and transmitters of high speed integrated circuits (ICs). This limitation is manifest both in terms of return loss and insertion loss.

One method to mitigate the effect of diode capacitance is by using inductors that incorporate the capacitance into a low-pass structure, effectively "tuning out" or broad-banding the capacitance.

Figure 2A:
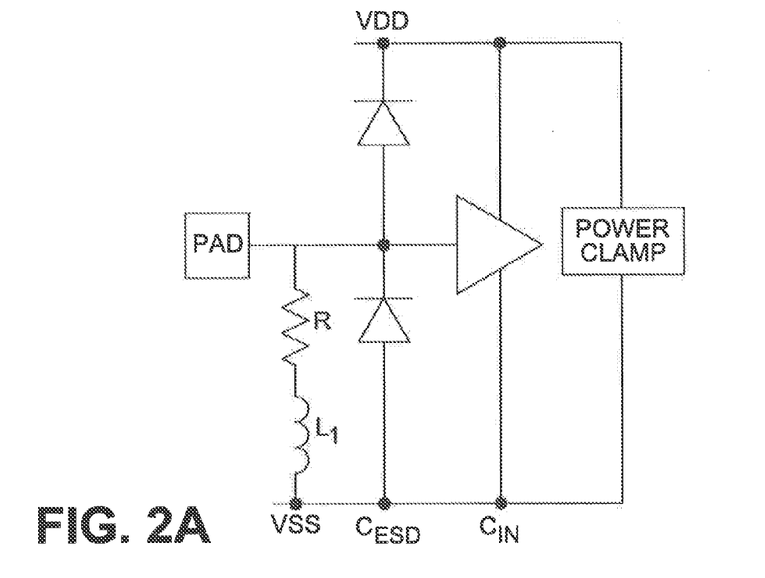
FIGS. 2A, 2B and 2C illustrate inductive broad-banding of ESD diode capacitance using shunt peaking, series peaking and T-coil peaking, respectively.
Figure 2B:
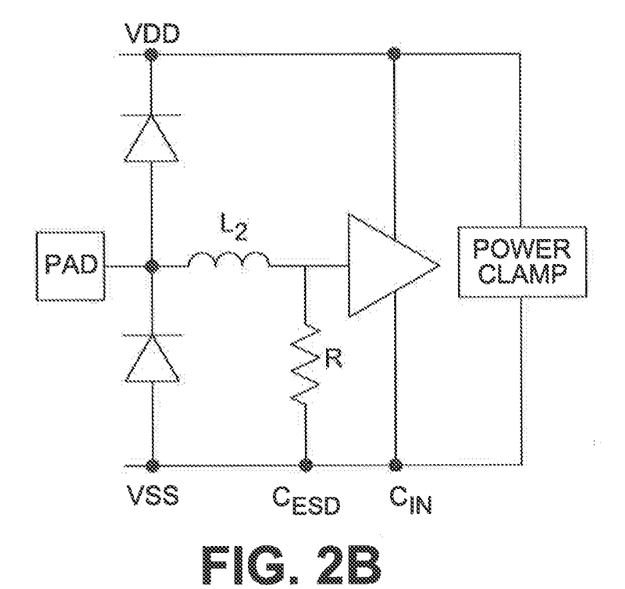
Figure 2C:
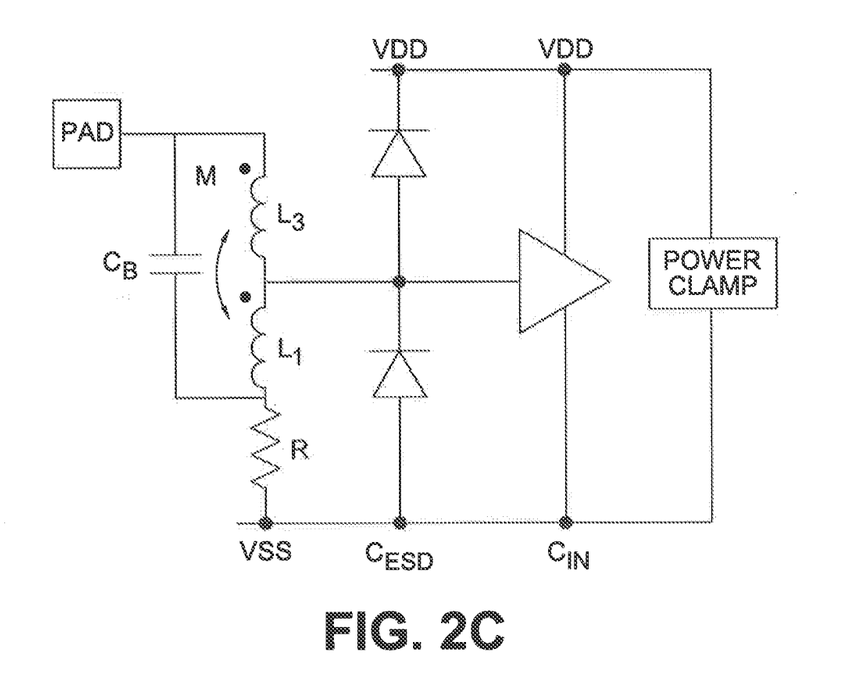

Assuming that the diodes are lumped, as opposed to distributed, there are three known methods (and possible combinations) of inductive tuning or broad-banding, as shown in FIGS. 2A, 2B and 2C. In these figures, on-chip termination and ESD protection are shown for a receiver circuit, and R denotes the termination resistor, which in an example implementation has a value of 50 0.

FIGS. 2A, 2B and 2C illustrate inductive broad-banding of ESD diode capacitance using shunt peaking, series peaking and T-coil peaking, respectively. Shunt peaking as shown in FIG. 2A provides a reasonable bandwidth extension (1.7×) of the received signal, as compared to the non-peaked case, but return loss is poor. Series peaking as shown in FIG. 2B can provide similar bandwidth extension with much improved return loss if the overall input capacitance $C_{ESD}+C_{IN}$ can be split by the peaking inductor. Superior bandwidth extension and return loss are achieved with the T-coil input match as shown in FIG. 2C. However, the protection diodes in FIG. 2C are not directly connected to the pad, and significant inductance is present between the pad and the ESD diodes.

The majority of ESD failures are caused by a discharge mechanism that is best-described by the Charged-Device Model (CDM) and its variants, in which devices are exposed to a charge at a standardized voltage level, then tested for survival. Discharge transients dI/dt in the CDM model are orders of magnitude higher than other models. Inductance in the discharge path between pad and diodes may cause high voltage peaks at the pad, leading to possible dielectric breakdown.

For all three methods of inductive peaking shown in FIGS. 2A, 2B, and 2C, the cut-off frequency is limited by the LC product of inductance and capacitance.

Figure 3:
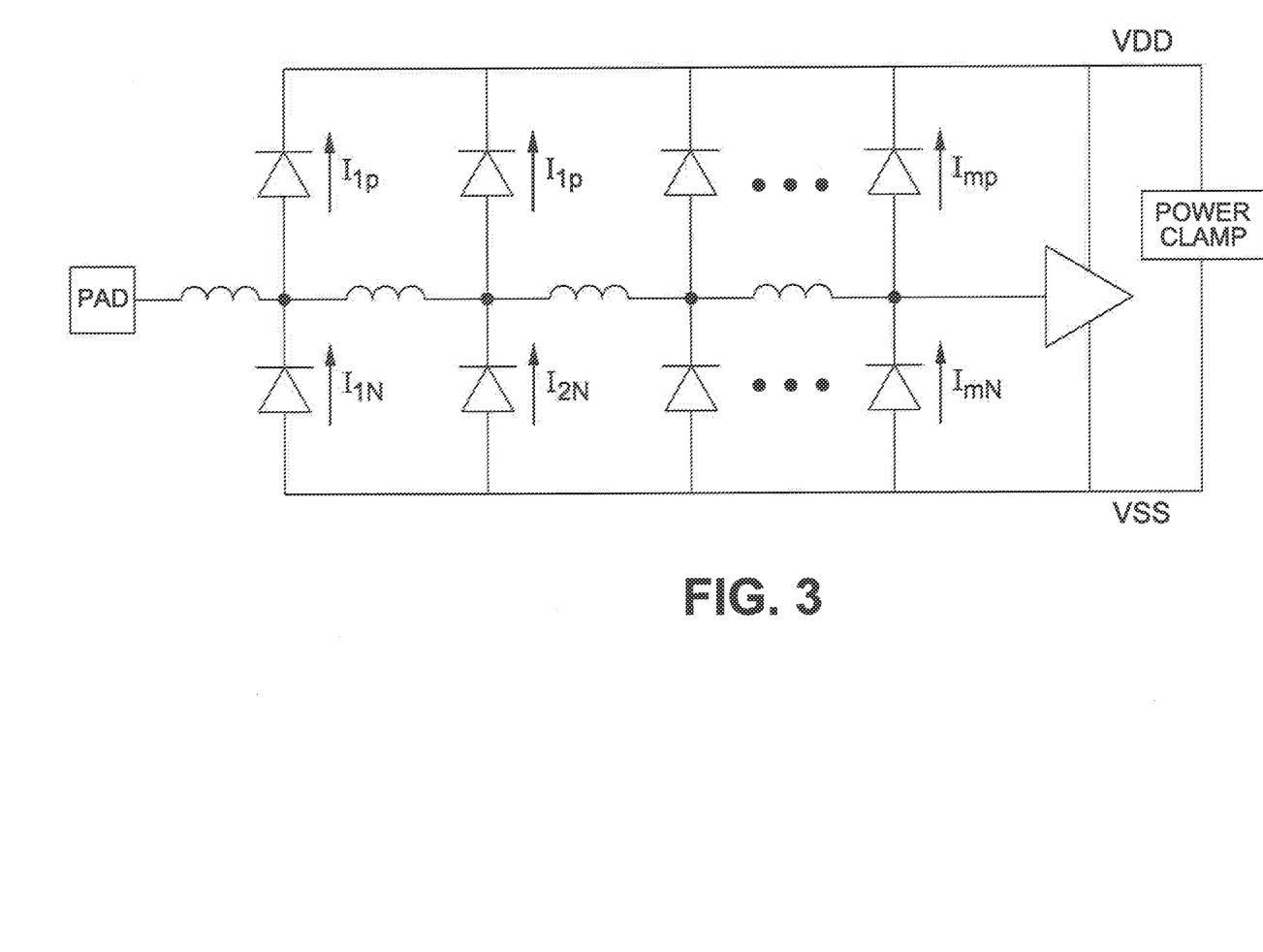
FIG. 3 illustrates a known distributed ESD protection approach.

A distributed approach, breaking the diodes up in multiple, smaller, LC sections of an artificial transmission line allows the cut-off frequency to be pushed out much further in frequency than is possible with a single lumped diode. FIG. 3 illustrates a known distributed ESD protection approach. Very good return loss and insertion loss can be achieved in this manner. However, each diode will see a different voltage and current profile, especially during a sub-nanosecond CDM event, when the inductive properties of the discharge path weigh in along with the resistive ones. As a result, ESD protection is not as effective as when the diodes are lumped together.

It is desirable to provide an improved ESD protection circuit that addresses at least one of the shortcomings of known approaches.

BRIEF DESCRIPTION OF THE DRAWINGS

Embodiments of the present disclosure will now be described, by way of example only, with reference to the attached Figures.

DETAILED DESCRIPTION

Generally, the present disclosure provides a distributed electrostatic discharge protection circuit. At frequencies beyond 10 GHz, the parasitic capacitance of primary ESD protection voltage clamping devices, such as diodes, hampers adequate insertion and return loss, in spite of lumped inductor tuning. An ESD protection circuit according to an embodiment of the present disclosure solves the problem by distributing the diode, or voltage clamping device, capacitance among several sections of an artificial transmission line. The power and ground ESD return paths are also distributed to ensure a constant current density in the voltage clamping segments, even for fast charged-device model (CDM) discharge events. By sharing the ESD return paths between differential inputs (or outputs), these return paths have no impact on differential return or insertion loss.

In an embodiment, the present disclosure provides an electrostatic discharge protection circuit for protecting a protected circuit, the ESD protection circuit comprising: a signal path; a plurality of voltage clamping sections each comprising a voltage clamping device, each of the plurality of voltage clamping sections having a signal end and a return end, each of the signal ends being connected to the signal path, the plurality of voltage clamping sections providing distributed ESD protection; and a single return node to which all of the return ends are connected so as to produce a single return path.

In an example embodiment, the plurality of voltage clamping sections each comprising a voltage clamping device comprise a plurality of diode sections each comprising a diode.

In an example embodiment, the return path comprises a plurality of return path impedance sections configured such that voltage drops along the return path match voltage drops along the signal path.

In an example embodiment, the return path comprises a plurality of return path impedance sections configured such that equal current densities are produced in each of the plurality of voltage clamping sections.

In an example embodiment, the return path comprises a plurality of return path impedance sections configured such that a constant current density is produced in each of the plurality of voltage clamping sections. In an example embodiment, the constant current density in the plurality of voltage clamping sections is maintained during a fast charged-device model discharge ESD event, or during a subnanosecond ESD event, or during an ESD event of any pulse shape or duration.

In an example embodiment, the return path is common mode such that differential return loss is unaffected by characteristics of the return path.

In an example embodiment, the signal path comprises initial and final impedance sections and a plurality of intermediate signal path impedance sections; and each of the signal ends of the plurality of voltage clamping sections is connected to the signal path adjacent to one of the plurality of intermediate signal path impedance sections.

In an example embodiment, the plurality of voltage clamping sections comprise a plurality of diode sections each comprising a diode. In an example embodiment, the diodes in the plurality of diode sections have equal diode areas, and each of the diodes in the plurality of diode sections contributes equally to the protection of the protected circuit. In an example embodiment, each of the plurality of intermediate signal path impedance sections has an impedance of Z, and the plurality of return path impedance sections have a geometric mean impedance value of Z.

In an example embodiment: the plurality of diode sections comprises N diode sections having diodes of equal size; the plurality of return path impedance sections comprises m return path impedance sections; and wherein values of the return path impedance sections are defined by $$Z_{Rm} = Z \cdot \frac{m}{N-m},$$

wherein $Z_{R1}$ is closest to the single return node and $Z_{Rm}$ is farthest from the single return node. In an example embodiment, the plurality of return path impedances comprises three impedance sections having impedance values of 3Z, Z and Z/3, in order of farthest from the return node to closest to the return node.

In an example embodiment, some of the diodes in the plurality of diode sections have unequal diode areas, and each of the diodes in the plurality of diode sections contributes equally to the protection of the protected circuit. In an example embodiment: the plurality of intermediate signal path impedance sections comprise m intermediate signal path impedance sections with respective impedances of $Z_1$ to $Z_m$; the plurality of diode sections comprises N diode sections having diodes of size $A_1$ to $A_k$; the plurality of return path impedance sections comprises m return path impedance sections; and wherein values of the return path impedance sections are defined by $$Z_{Rm} = Z_m \cdot \frac{\sum_{k=1}^{m} A_k}{\sum_{k=m+1}^{N} A_k},$$

wherein $Z_{R1}$ is closest to the single return node and $Z_{Rm}$ is farthest from the single return node.

In an example embodiment, each of the voltage clamping devices in the plurality of voltage clamping sections absorbs the same current density, or has an equal voltage across the voltage clamping device.

In an example embodiment, each of plurality of voltage clamping sections comprises only the voltage clamping device between the signal end and the return end.

In an embodiment, the present disclosure provides an electrostatic discharge protection circuit for protecting a protected circuit, the ESD protection circuit comprising: a signal path; a return path; and a plurality of voltage clamping sections each comprising a voltage clamping device, the plurality of voltage clamping sections having a signal end connected to the signal path and a return end connected to the return path, each of the plurality of voltage clamping sections contributing equally to the protection of the protected circuit.

In an example embodiment, each of the plurality of voltage clamping sections comprises only the voltage clamping device between the signal end and the return end.

In an example embodiment, the ESD protection circuit further comprises a single return node to which all of the return ends are connected so as to produce a single return path. In an example embodiment, the plurality of voltage clamping sections comprise a plurality of diode sections each comprising a diode. In an example embodiment, the diodes in the plurality of diode sections have equal diode areas, and each of the diodes in the plurality of diode sections contributes equally to the protection of the protected circuit. In an example embodiment, some of the diodes in the plurality of diode sections have unequal diode areas, and each of the diodes in the plurality of diode sections contributes equally to the protection of the protected circuit.

In an example embodiment, the plurality of voltage clamping sections comprise, in order from farthest from an input/output pad to closest to the I/O pad: a first voltage clamping section including only the voltage clamping device; a second voltage clamping section including the voltage clamping device and a resistance of R; a third voltage clamping section including the voltage clamping device and a resistance of 3R; and a fourth voltage clamping section including the voltage clamping device and a resistance of 6R.

In a further embodiment, the present disclosure provides an ESD protection circuit for protecting a protected circuit, the ESD protection circuit comprising: a first signal path; a first return path connected to a source voltage; and a first plurality of voltage clamping sections each comprising a first voltage clamping device, the first plurality of voltage clamping sections having a signal end connected to the first signal path and a return end connected to the first return path, each of the first plurality of voltage clamping sections contributing equally to the protection of the protected circuit. The ESD protection circuit further comprises: a second signal path; a second return path connected to a drain voltage; and a second plurality of voltage clamping sections each comprising a second voltage clamping device, the second plurality of voltage clamping sections having a signal end connected to the second signal path and a return end connected to the second return path, each of the second plurality of voltage clamping sections contributing equally to the protection of the protected circuit.

Other aspects and features of the present disclosure will become apparent to those ordinarily skilled in the art upon review of the following description of specific embodiments in conjunction with the accompanying figures.

Existing approaches to the broad-band tuning of primary ESD protection devices can be divided in lumped-element tuning and distributed tuning. Examples of lumped-element tuning include the following, which are incorporated herein by reference in their entirety: T-coil peaking, as shown in FIG. 2C, is described in S. Galal and B. Razavi, "Broadband ESD protection circuits in CMOS technology," *IEEE J. Solid-State Circuits*, Vol. 38, No. 12, pp. 2334-2340, December 2003; series peaking, as shown in FIG. 2B, is described in U.S. Pat. No. 7,005,939 B2 "Input/output circuit with on-chip inductor to reduce parasitic capacitance," February 2006.

Examples of distributed tuning include the following, which are also incorporated herein by reference in their entirety: equal-sized diodes are described in B. Kleveland, T. J. Maloney, I. Morgan, L. Madden, T. H. Lee, and S. S. Wong, "Distributed ESD protection for high-speed integrated circuits," *IEEE Electron Device Lett.*, vol. 21, no. 8, pp. 390-392, August 2000, as well as in U.S. Pat. No. 5,969,929, Kleveland et al., "Distributed ESD Protection Device for High Speed Integrated Circuits," October 1999.; inductor/diode ladders are described in US Pat. App. 2005/0162790 A1, "Electrostatic Discharge Protection Circuit," July 2005; diminishing diode sizes to address current density problems are described in M-D. Ker and B-J. Kuo, "Decreasing-Size Distributed ESD Protection Scheme for Broad-Band RF Circuits," *IEEE Trans. MTT*, February 2005, and in US Pat. App. 2006/0256489 A1, Ker at al., "ESD Protection Circuits with Impedance Matching for Radio-Frequency Applications," November 2006.

Embodiments of the present disclosure address the problem of current distribution in a distributed ESD circuit by having both the signal path and the return path configured to equalize the voltage and current profiles for each diode that contributes to the absorption of the ESD discharge.

Consider a conventional inductor-diode ladder that comprises a distributed ESD protection circuit with four equal inductor-diode sections. For the sake of simplicity, only the ground/VSS return path is taken into account.

Figure 4:
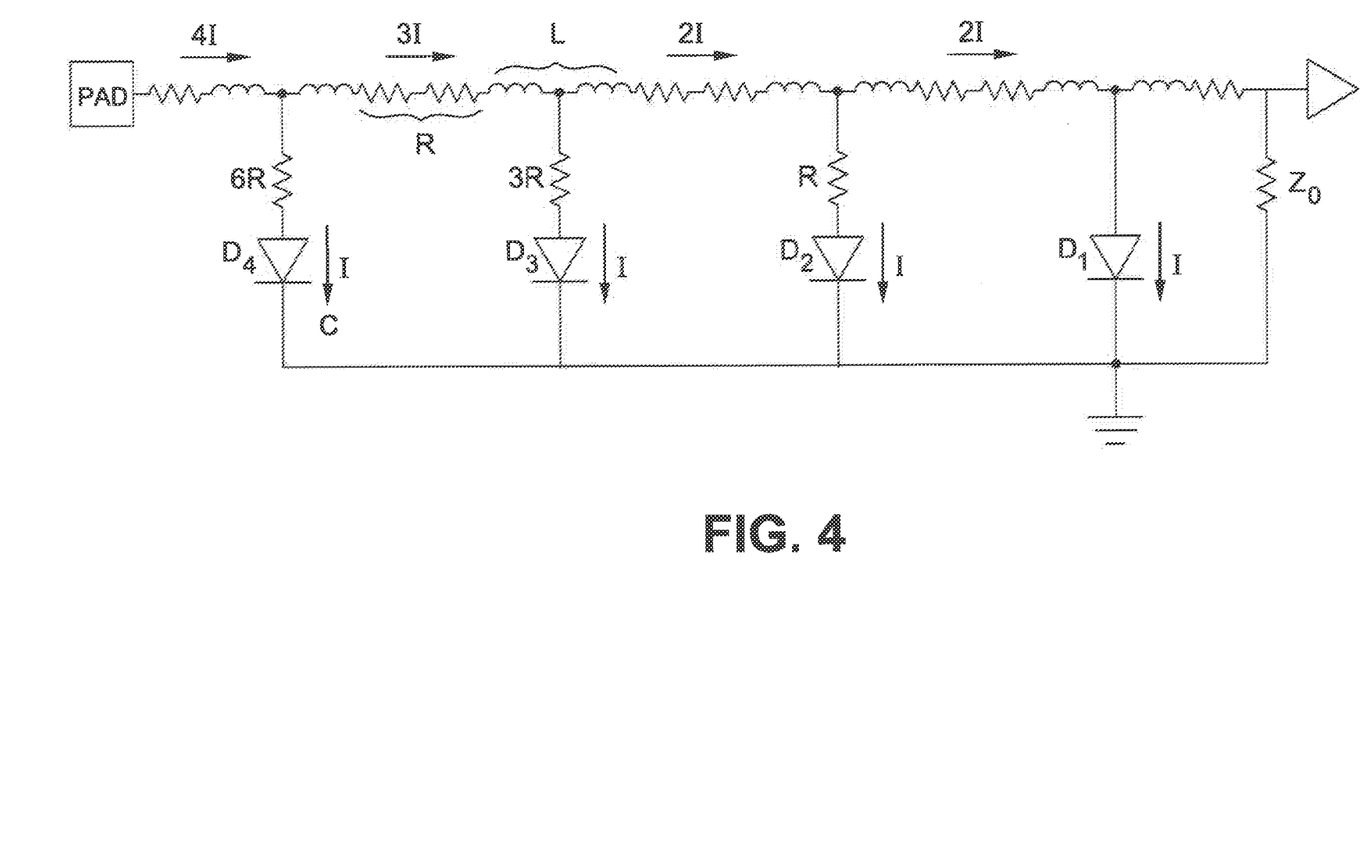
FIG. 4 illustrates a distributed ESD protection circuit with current balancing according to an embodiment of the present disclosure.

FIG. 4 illustrates a distributed ESD protection circuit with current balancing according to an embodiment of the present disclosure. FIG. 4 shows the resistances R of each inductor, representing its loss, both for DC and at RF. For now, the reactance of the inductors is ignored, and it is assumed that the return is a solid, non-distributed ground. Although using balancing resistors in series with the diodes is suggested in U.S. Pat. No. 5,969,929, the specific resistor values in FIG. 4 are used to effect equal current distribution among the ESD diodes according to an embodiment of the present disclosure.

Embodiments of the present disclosure comprise voltage clamping sections each including a voltage clamping device. A voltage clamping device, or voltage limiting device, refers to any device that behaves or looks like a capacitor under normal bias, and conducts or has a threshold (like a zener diode) under forward bias, and clamps the voltage under an ESD event. The voltage clamping device limits the voltage under the discharge current to keep the voltage under a destructive number/threshold. In an example embodiment, the voltage clamping sections each comprising a voltage clamping device comprise a plurality of diode sections each comprising a diode.

While many example embodiments are described herein with respect to diodes as an example implementation, it is to be understood that each of those embodiments may also be implemented with other voltage clamping devices or voltage limiting devices, with appropriate modifications being known to one of ordinary skill in the art.

Working back from the termination $Z_o$, if voltage clamping device, or diode, $D_1$ carries a current I then that current also flows through the inductor between $D_1$ and $D_2$, increasing the voltage drop across the $D_2$ section by the product IR. To equalize the currents through $D_1$ and $D_2$ we need to add a resistance R in series with $D_2$. Similarly, the inductor between $D_2$ and $D_3$ carries the sum 2I of the currents through $D_1$ and $D_2$ adding a voltage drop 2IR+IR=3IR to the $D_3$ diode and requiring a resistance of 3R to maintain a current I through $D_3$. The next section adds a 3IR drop, bringing the total for diode $D_4$ to 6IR and an addition of 6R in series with $D_4$.

The result is a distributed ESD circuit according to an embodiment of the present disclosure that provides an equal current distribution for relatively slow discharge events. The equal current distribution is due to the specifically selected resistor values according to an embodiment of the present disclosure, which are not disclosed or suggested in known inductor-diode ladder approaches. The voltage at the input of the CMOS circuit is equal to the voltage drop of a quarter of the overall ESD current passing through a quarter of the overall diode junction, the same protection as lumping the four diodes $D_1$ to $D_4$ together would provide.

To make embodiments of the present disclosure effective for all types of ESD events three aspects should be addressed: a) the return current path, b) the reactance of the inductor sections and c) the additional loss introduced by the current balancing resistances.

Embodiments of the present disclosure will be described in progressive stages, starting at the specific and ending with the most general case. The first stage in making the circuit of FIG. 4 more effective is to include the current return path.

Figure 5:
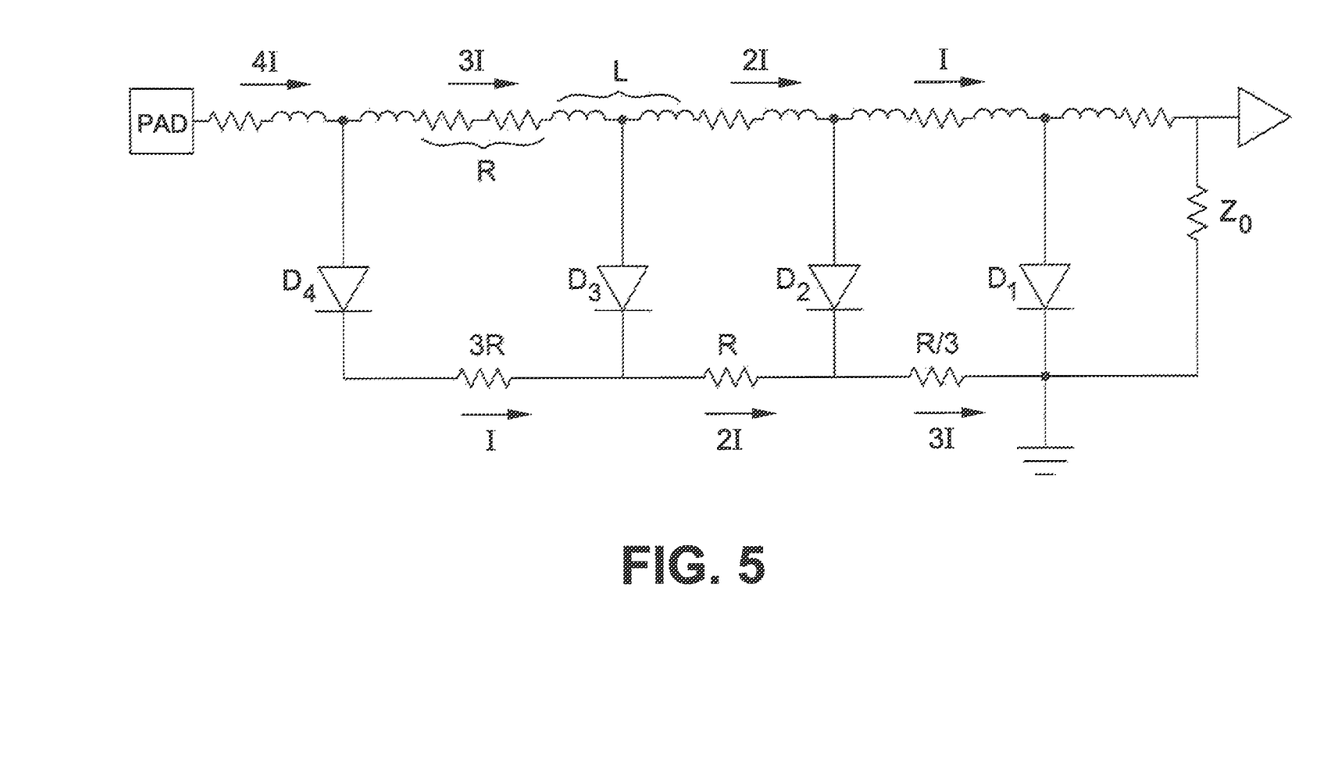
FIG. 5 illustrates a distributed ESD protection chain with equal diodes and single resistively-balanced return path according to an embodiment of the present disclosure.

FIG. 5 illustrates a distributed ESD protection chain with equal diodes and single resistively-balanced return path according to an embodiment of the present disclosure. In FIG. 5 a single return node RN is defined for the diode currents to return, which is also the reference for the termination of the artificial transmission line.

It is clear in FIG. 5 that the overall current passing down the transmission line remains constant. As the current density in the signal path is reduced at each rung of the ladder, the current density in the return path increases. In an embodiment, balancing diode currents is achieved by maintaining equal voltage drops in each path.

Figure 6:
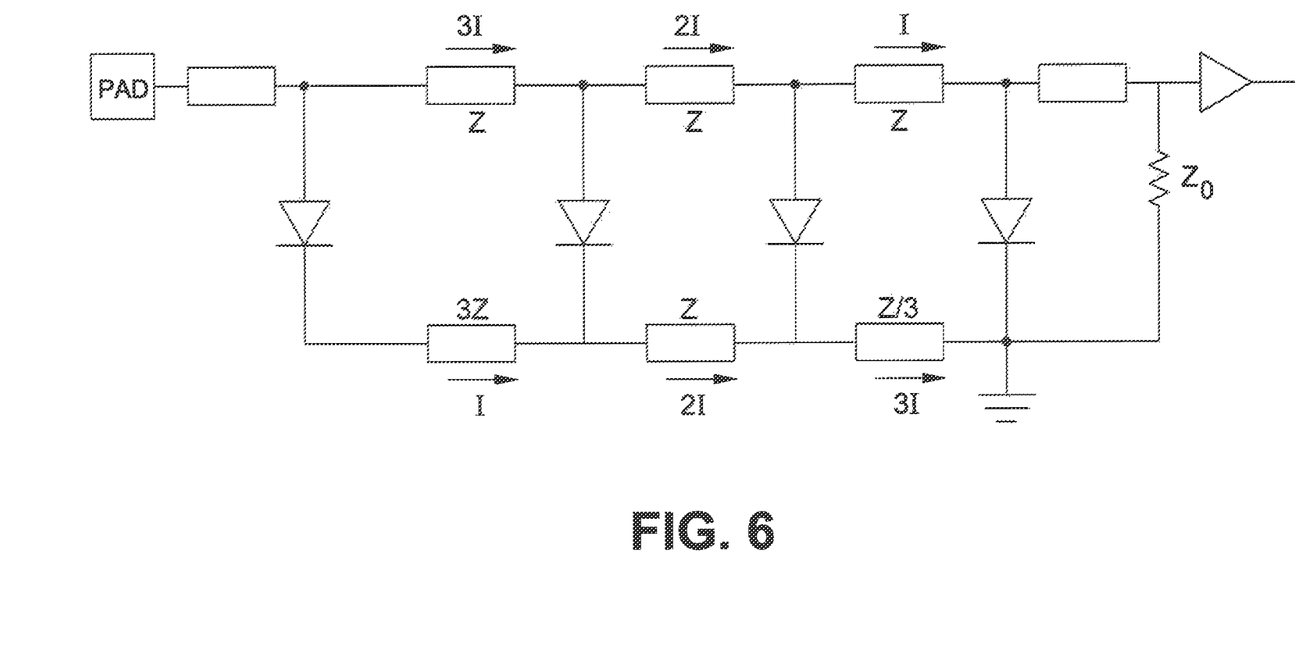
FIG. 6 illustrates a distributed ESD protection circuit according to an embodiment of the present disclosure having an impedance-balanced return path.

FIG. 6 illustrates a distributed ESD protection circuit according to an embodiment of the present disclosure having an impedance-balanced return path. In this embodiment, the design is extended to a distributed ESD diode chain with arbitrary diode sizes so that it is effective for arbitrary impedances inserted in the signal path. The second stage in the process is to exchange the inductors with series resistances in FIG. 5 for arbitrary impedances Z as shown in FIG. 6.

Assuming again equal diode sizes this embodiment requires diminishing impedance values in the return path. In general, for N equal diode sections and a tuning impedance Z in each series branch in the signal path between diode sections, the return path impedance in the mth return path branch (between diodes $D_m$ and $D_{m+1}$) needs to satisfy the following condition that the voltage in the signal path branch equals the voltage in the return path branch:

$$Z \cdot m \cdot I = Z_{Rm} \cdot (N-m) \cdot I = V_m$$

And, consequently:

$$Z_{Rm} = Z \cdot \frac{m}{N-m}$$

In the case of FIG. 6 N=4 and so the impedances in the return branches are:

$$Z_{R1} = Z/3$$

$$Z_{R2} = Z$$

$$Z_{R3} = 3Z$$

Figure 7:
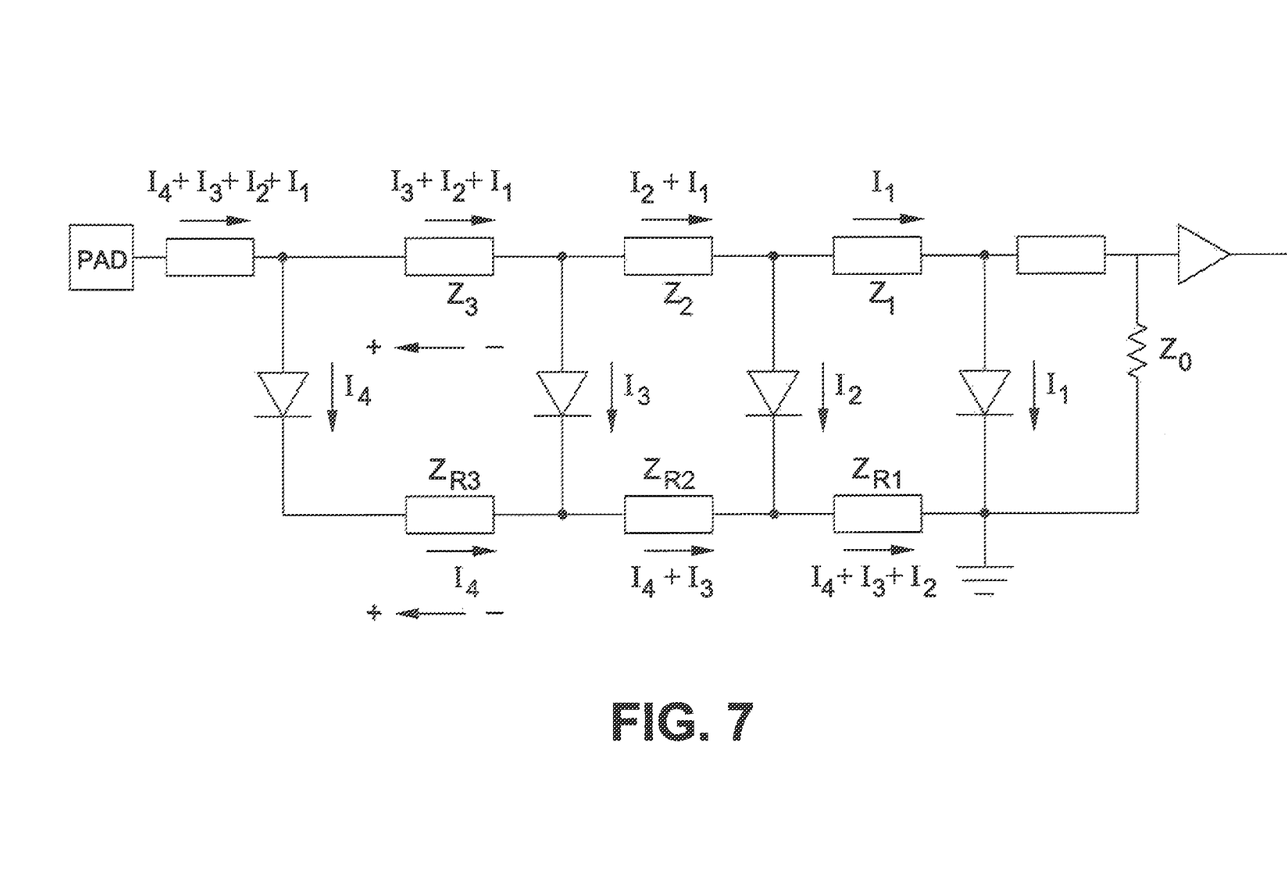
FIG. 7 illustrates a distributed ESD protection circuit according to an embodiment of the present disclosure having unequal diodes and tuning impedances.

FIG. 7 illustrates a distributed ESD protection circuit according to an embodiment of the present disclosure having unequal diodes and tuning impedances. In this embodiment, the specific case of FIG. 6 is expanded to the general case where Z can be any combination of inductors and/or transmission line sections and the diodes do not have to be equal in size. The case for N=4 is shown in FIG. 7.

Equating the voltages across signal path and return branches—e.g. $V(Z_3) = V(Z_{R3})$—results in:

$$Z_{R1} = Z_1 \cdot \frac{A_1}{A_2 + A_3 + A_4}$$

$$Z_{R2} = Z_2 \cdot \frac{A_1 + A_2}{A_3 + A_4}$$

$$Z_{R3} = Z_3 \cdot \frac{A_1 + A_2 + A_3}{A_4}$$

Here $A_k$ denotes the size (junction area) of diode $D_k$.

The case of N=4 can be expanded to an arbitrary number of sections N. The balancing impedance in the return path between diode $D_m$ and $D_{m+1}$ is:

$$Z_{Rm} = Z_m \cdot \frac{\sum_{k=1}^{m} A_k}{\sum_{k=m+1}^{N} A_k}$$

Figure 8:
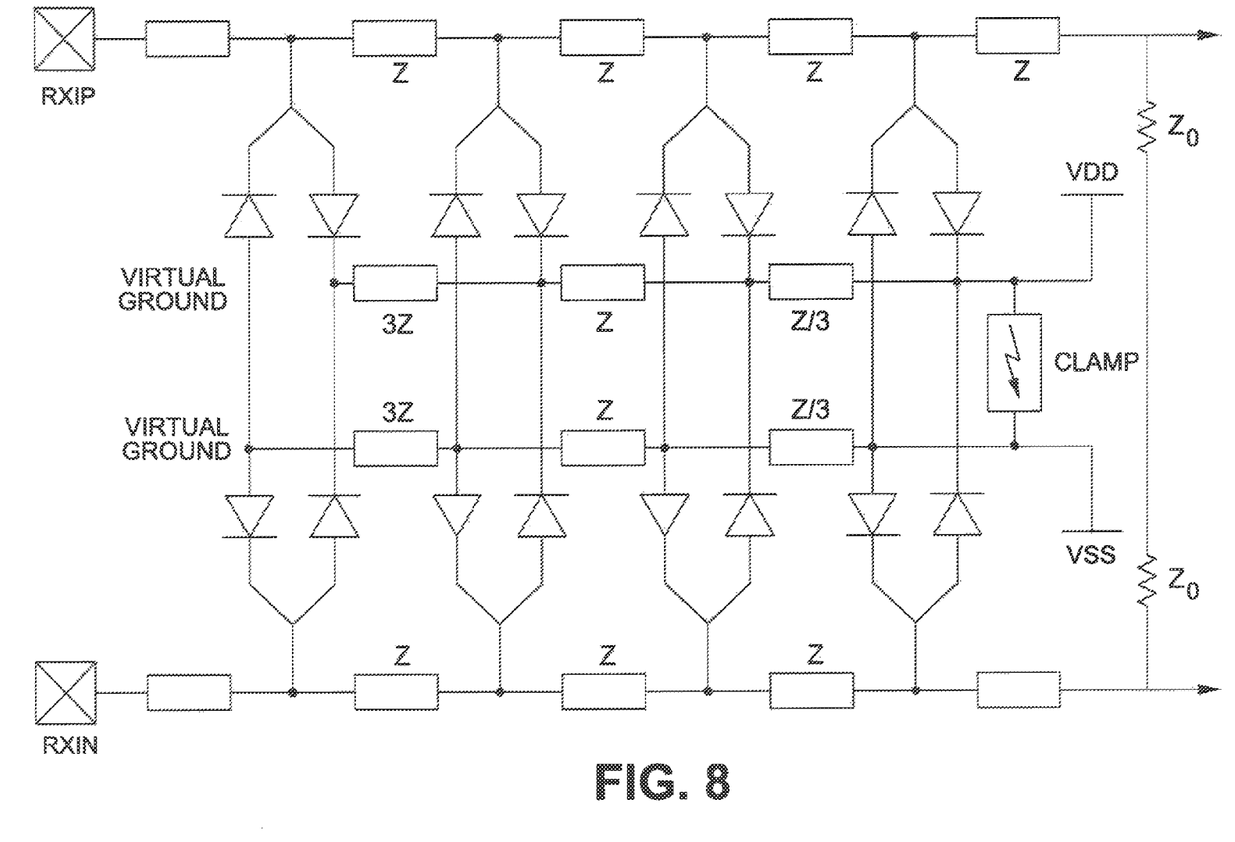
FIG. 8 illustrates a receiver circuit including a distributed ESD protection according to an embodiment of the present disclosure.

FIG. 8 illustrates a receiver circuit including a distributed ESD protection according to an embodiment of the present disclosure. The embodiment of FIG. 8 shows the ESD protection approach in a specific example application. In an example embodiment, the full benefit of the distributed ESD protection approach according to an embodiment of the present disclosure is achieved when used in a differential or balanced receiver or transmitter interface.

FIG. 8 shows all the elements of a differential input transmission line with distributed ESD diodes for the case of four equal-sized diode sections. Note that although there are four ESD diodes per section, there are only two return paths: each return path is shared between the RXIP and the RXIN input paths. An important benefit from this arrangement is that the ESD return paths are common mode: they do not affect the (differential) signal path and thus have no effect on the differential return and insertion loss. The points where the diodes tap into the return lines are virtual grounds for the differential signal.

FIG. 8 shows a typical application of an embodiment of the present disclosure. Here the circuit is placed between the differential input pads RXIP and RXIN of a wideband data receiver with terminations $Z_o$ which, in an example embodiment, are 50Ω resistors. The impedance-matching elements Z can be sections of transmission lines, or inductors, or any other elements having impedance, or a combination thereof.

Figure 9:
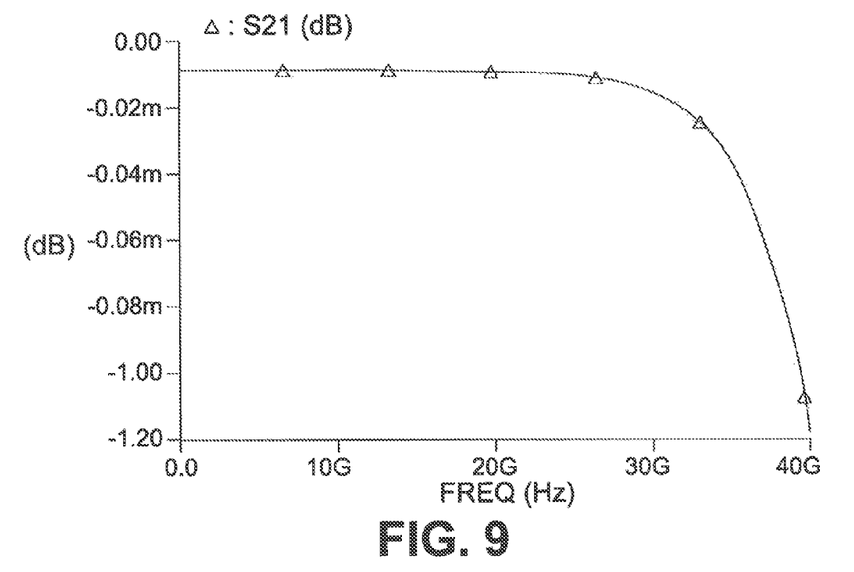
FIG. 9 is a graph illustrating differential insertion loss for a differential ESD protection circuit according to an embodiment of the present disclosure.

Test results for the topology of FIG. 8 are shown in FIG. 9. For this particular example embodiment, the tuning impedance Z consists of a 100 pH inductor with 0.2Ω series loss resistance; the ESD diodes have a 20 fF junction capacitance and a 3.5Ω series resistance. The termination resistors $Z_o$ are 50Ω.

Figure 10:
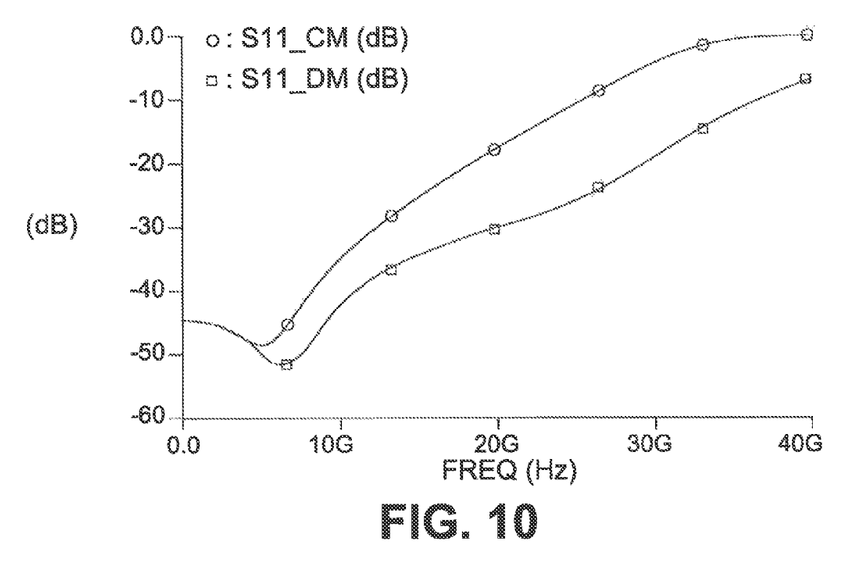
FIG. 10 is a graph illustrating differential and common mode return loss for a differential ESD protection circuit according to an embodiment of the present disclosure.
Figure 11:
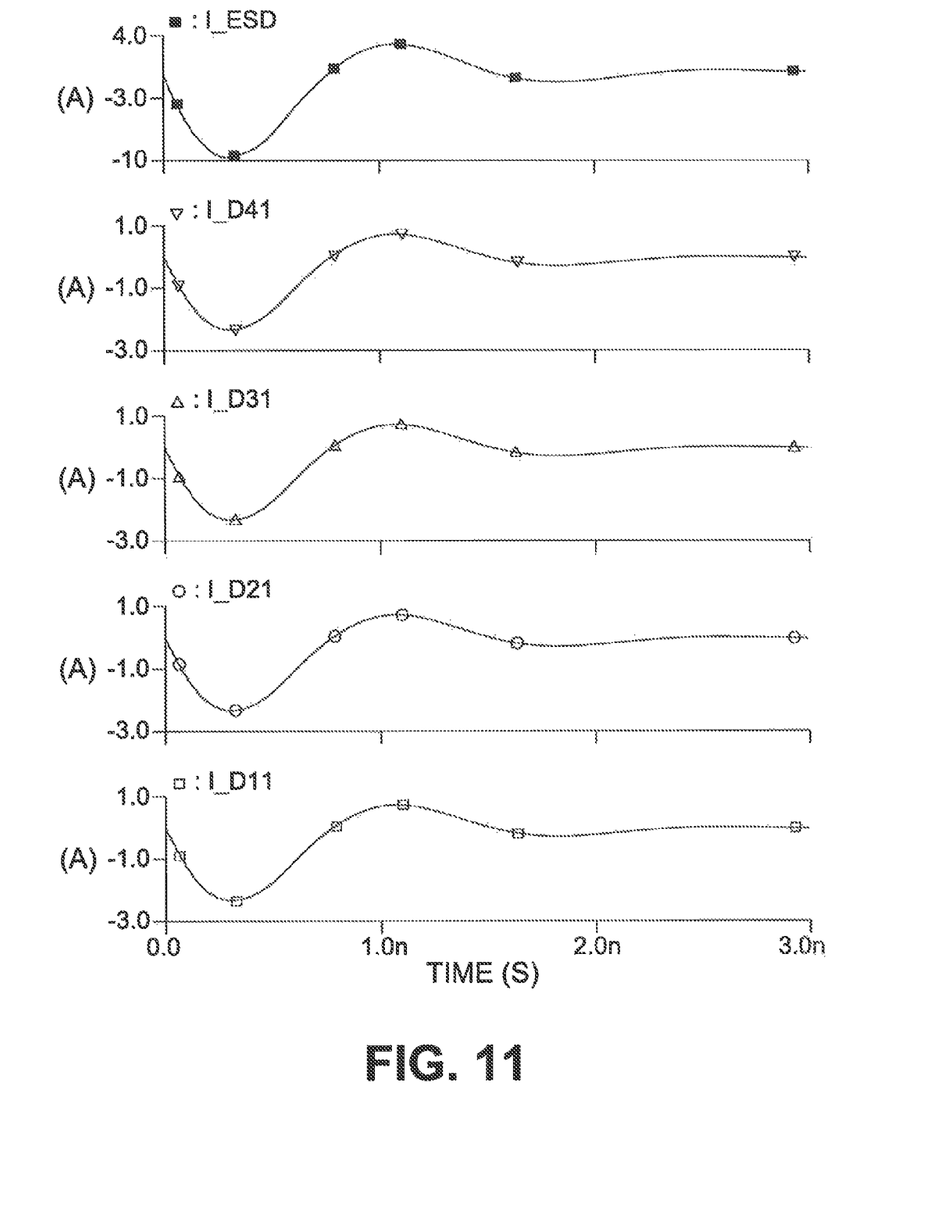
FIG. 11 is a graph illustrating ESD currents, total and individual diode currents for a differential ESD protection circuit according to an embodiment of the present disclosure.

FIG. 9 is a graph illustrating differential insertion loss for a differential ESD protection circuit according to an embodiment of the present disclosure. FIG. 10 is a graph illustrating differential and common mode return loss for a differential ESD protection circuit according to an embodiment of the present disclosure. FIG. 11 is a graph illustrating ESD currents, total and individual diode currents for a differential ESD protection circuit according to an embodiment of the present disclosure.

Any time an ESD protection diode pair is split up into two or more sections, a method according to an embodiment of the present disclosure can be applied to ensure proper ESD current distribution between diode sections. In the extreme case of two diode sections the Z impedance sections are equal, which can improve layout and floorplanning. The other extreme deals with a circuit in which both matching impedances and ESD diodes are distributed. In that case both signal line and return line may be tapered, albeit in opposite fashion.

Figure 12:
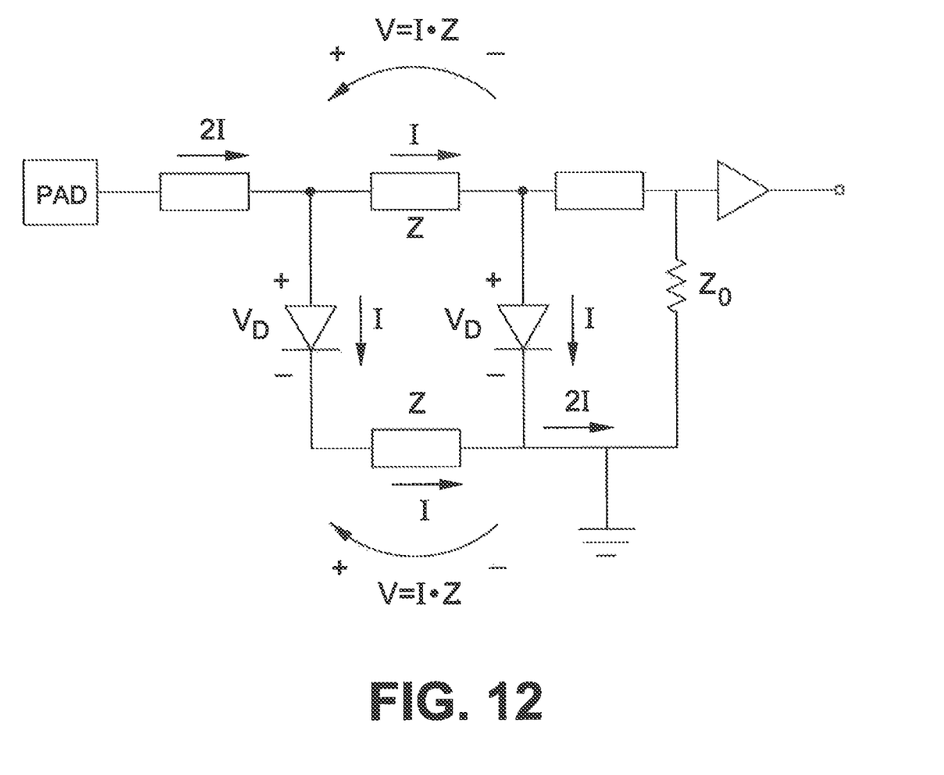
FIG. 12 illustrates a distributed ESD protection circuit according to an embodiment of the present disclosure having two diode sections.

FIG. 12 illustrates a distributed ESD protection circuit according to an embodiment of the present disclosure having two diode sections. In the case where there are two diodes, the compensating impedance is just Z, which is the impedance in the signal path. This embodiment is similar to the middle section of FIG. 6. The current through the diodes is I, since a current of 2I is coming in from the pad, and 1I splits off, and 1I continues through the signal path. The current I going to the first diode also goes through Z, because the same drop exists between the two anodes and the two cathodes of the two diodes. In this example embodiment, since those two impedances are identical, the circuit is easy to implement, for example easier than implementing Z/3. For this particular application, in an example embodiment the bandwidth can be doubled with just two sets, compared to that of single section with the single diode. More importantly, there is better protection with three sections than with just one.

Figure 13:
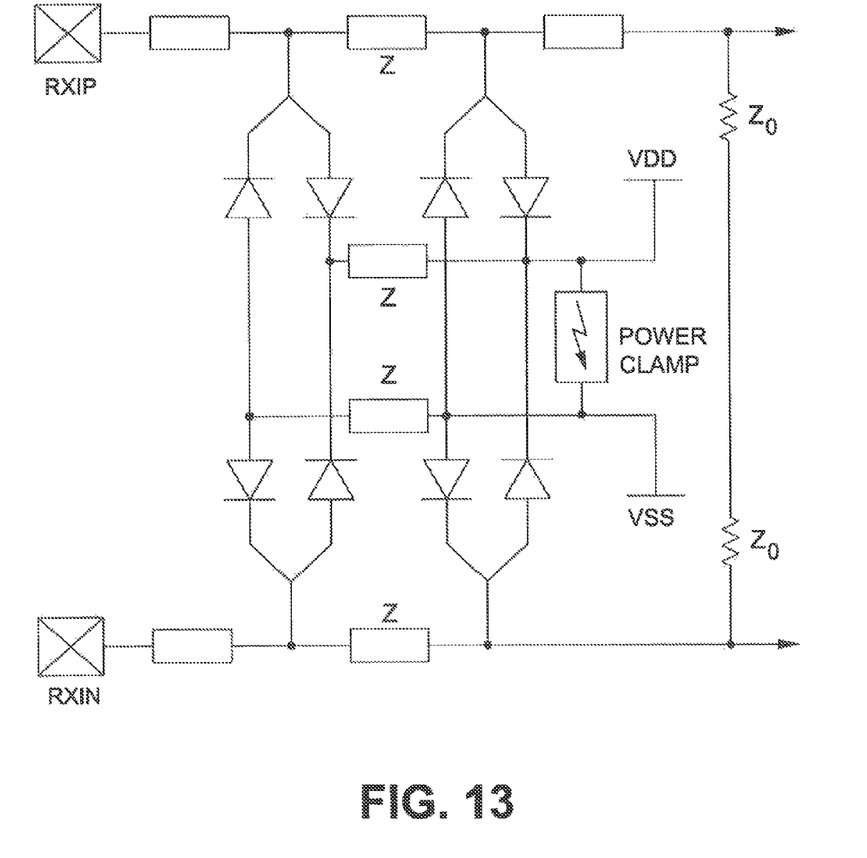
FIG. 13 illustrates a receiver circuit including a distributed ESD protection according to an embodiment of the present disclosure having two diode sections.

FIG. 13 illustrates a receiver circuit including a distributed ESD protection according to an embodiment of the present disclosure having two diode sections.

Embodiments of the present disclosure described above relate to broad-band on-chip receivers and transmitters in general and specifically to high speed data links in the 10+Gb/s range, including optical receivers and transmitters.

The trend towards higher data rate electrical interfaces has led to the development of integrated circuits that are more susceptible to damage from electrostatic discharge. Much of that damage is latent, leading to costly system failures in the field. Current solutions are geared towards ESD test standards such as Human Body Model (HBM) and Machine Model (MM), which do not suitably address the cause of the problem. The HBM simulates the discharge that might occur when a human touches an electronic device. Embodiments of the present disclosure allow for the signal integrity of high speed chips to be maintained without compromising ESD protection.

Embodiments of the present disclosure provide a circuit that implements a distributed ESD protection method that ensures equal current densities among diode sections. The embodiments are based on creating an ESD current return path along which voltage drops match those along the signal path, ensuring equal voltage/current profiles across shunt sections, containing the ESD diodes. The ESD return path does not affect the differential performance of the circuit.

Example embodiments of the present disclosure provide one or more of the following features, characteristics or advantages: power and ground return paths are included in the circuit; equal current distribution is achieved in ESD diodes for any pulse shape or duration, including sub-nanosecond CDM events; balancing impedances/resistances are more compact, for example total impedance of $4\frac{1}{3}$ Z compared to 10Z in known approaches in case of 4 sections; return paths are shared between differential I/O paths; return paths are common mode and hence do not affect differential return/insertion loss, so that the differential signal path can therefore be designed with performance in mind only; arbitrary impedance matching elements can be used: inductors and transmission lines of varying inductances and lengths, so that the only limitation is the physical implementation of the return paths; the number of sections in the ESD chain based on the invention can range from 2 to infinity (fully distributed ESD).

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

What is claimed is:

1. An electrostatic discharge (ESD) protection circuit for protecting a protected circuit, the ESD protection circuit comprising:
   a signal path;
   a plurality of voltage clamping sections each comprising a voltage clamping device, each of the plurality of voltage clamping sections having a signal end and a return end, each of the signal ends being connected to the signal path, the plurality of voltage clamping sections providing distributed ESD protection; and
   a single return node to which all of the return ends are connected so as to produce a single return path, the return path comprising a plurality of return path impedance sections configured such that voltage drops along the return path match voltage drops along the signal path.

2. The ESD protection circuit of claim 1 wherein the return path comprises a plurality of return path impedance sections configured such that equal current densities are produced in each of the plurality of voltage clamping sections.

3. The ESD protection circuit of claim 1 wherein the return path comprises a plurality of return path impedance sections configured such that a constant current density is produced in each of the plurality of voltage clamping sections.

4. The ESD protection circuit of claim 3 wherein the constant current density in the plurality of voltage clamping sections is maintained during a fast charged-device model discharge ESD event.

5. The ESD protection circuit of claim 3 wherein the constant current density in the plurality of voltage clamping sections is maintained during a sub-nanosecond ESD event.

6. The ESD protection circuit of claim 3 wherein the constant current density in the plurality of voltage clamping sections is maintained during an ESD event of any pulse shape or duration.

7. The ESD protection circuit of claim 1 wherein the return path is common mode such that differential return loss is unaffected by characteristics of the return path.

8. The ESD protection circuit of claim 1 wherein each of the voltage clamping devices in the plurality of voltage clamping sections absorbs the same current density.

9. The ESD protection circuit of claim 1 wherein each of the voltage clamping devices in the plurality of voltage clamping sections has an equal voltage across the voltage clamping device.

10. The ESD protection circuit of claim 1 wherein each of plurality of voltage clamping sections comprises only the voltage clamping device between the signal end and the return end.

11. The ESD protection circuit of claim 1 wherein:
the signal path comprises initial and final impedance sections and a plurality of intermediate signal path impedance sections; and
each of the signal ends of the plurality of voltage clamping sections is connected to the signal path adjacent to one of the plurality of intermediate signal path impedance sections.

12. The ESD protection circuit of claim 11 wherein the plurality of voltage clamping sections comprise a plurality of diode sections each comprising a diode.

13. The ESD protection circuit of claim 12 wherein the diodes in the plurality of diode sections have equal diode areas, and each of the diodes in the plurality of diode sections contributes equally to the protection of the protected circuit.

14. The ESD protection circuit of claim 13 wherein each of the plurality of intermediate signal path impedance sections has an impedance of Z, and the plurality of return path impedance sections have a geometric mean impedance value of Z.

15. The ESD protection circuit of claim 14 wherein:
the plurality of diode sections comprises N diode sections having diodes of equal size;
the plurality of return path impedance sections comprises m return path impedance sections; and
wherein values of the return path impedance sections are defined by $$Z_{Rm} = Z \cdot \frac{m}{N-m}$$

wherein $Z_{R1}$ is closest to the single return node and $Z_{Rm}$ is farthest from the single return node.

16. The ESD protection circuit of claim 15 wherein the plurality of return path impedances comprises three impedance sections having impedance values of 3Z, Z and Z/3, in order of farthest from the return node to closest to the return node.

17. The ESD protection circuit of claim 12 wherein some of the diodes in the plurality of diode sections have unequal diode areas, and each of the diodes in the plurality of diode sections contributes equally to the protection of the protected circuit.

18. The ESD protection circuit of claim 17 wherein:
the plurality of intermediate signal path impedance sections comprise m intermediate signal path impedance sections with respective impedances of $Z_1$ to $Z_m$;
the plurality of diode sections comprises N diode sections having diodes of size $A_1$ to $A_k$;
the plurality of return path impedance sections comprises m return path impedance sections; and
wherein values of the return path impedance sections are defined by $$Z_{Rm} = Z_m \cdot \frac{\sum_{k=1}^{m} A_k}{\sum_{k=m+1}^{N} A_k}$$

wherein $Z_{R1}$ is closest to the single return node and $Z_{Rm}$ is farthest from the single return node.

19. An electrostatic discharge (ESD) protection circuit for protecting a protected circuit, the ESD protection circuit comprising:
a signal path;
a return path; and
a plurality of voltage clamping sections each comprising a voltage clamping device, the plurality of voltage clamping sections having a signal end connected to the signal path and a return end connected to the return path, each of the plurality of voltage clamping sections contributing equally to the protection of the protected circuit, each of the plurality of voltage clamping sections comprising only the voltage clamping device between the signal end and the return end.

20. The ESD protection circuit of claim 19 further comprising:
a single return node to which all of the return ends are connected so as to produce a single return path.

21. The ESD protection circuit of claim 19 wherein the return path is common mode such that differential return loss is unaffected by characteristics of the return path.

22. The ESD protection circuit of claim 19 wherein the plurality of voltage clamping sections comprise, in order from farthest from an input/output pad to closest to the I/O pad:
a first voltage clamping section including only the voltage clamping device;
a second voltage clamping section including the voltage clamping device and a resistance of R;
a third voltage clamping section including the voltage clamping device and a resistance of 3R; and
a fourth diode section including the voltage clamping device and a resistance of 6R.

23. The ESD protection circuit of claim 19 wherein the plurality of voltage clamping sections comprise a plurality of diode sections each comprising a diode.

24. The ESD protection circuit of claim 21 wherein the diodes in the plurality of diode sections have equal diode areas, and each of the diodes in the plurality of diode sections contributes equally to the protection of the protected circuit.

25. The ESD protection circuit of claim 21 wherein some of the diodes in the plurality of diode sections have unequal diode areas, and each of the diodes in the plurality of diode sections contributes equally to the protection of the protected circuit.

26. An electrostatic discharge (ESD) protection circuit for protecting a protected circuit, the ESD protection circuit comprising:
a first signal path;
a first return path connected to a source voltage;
a first plurality of voltage clamping sections each comprising a first voltage clamping device, the first plurality of voltage clamping sections having a signal end connected to the first signal path and a return end connected to the first return path, each of the first plurality of voltage clamping sections contributing equally to the protection of the protected circuit;
a second signal path;
a second return path connected to a drain voltage; and
a second plurality of voltage clamping sections each comprising a second voltage clamping device, the second plurality of voltage clamping sections having a signal end connected to the second signal path and a return end connected to the second return path, each of the second plurality of voltage clamping sections contributing equally to the protection of the protected circuit.

* * * * *